(12) United States Patent
Jerome et al.

(10) Patent No.: US 6,622,465 B2
(45) Date of Patent: Sep. 23, 2003

(54) APPARATUS AND METHOD FOR A MATERIAL COLLECTION FILL INDICATOR

(75) Inventors: Russell R. Jerome, Horicon, WI (US); Randy E. Benway, Horicon, WI (US)

(73) Assignee: Deere & Company, Moline, IL (US)

( * ) Notice: Subject to any disclaimer, the term of this patent is extended or adjusted under 35 U.S.C. 154(b) by 18 days.

(21) Appl. No.: 09/901,955

(22) Filed: Jul. 10, 2001

(65) Prior Publication Data

US 2003/0010005 A1 Jan. 16, 2003

(51) Int. Cl.[7] .................. A01D 34/00; A01D 43/00
(52) U.S. Cl. .................. 56/203; 56/12.8; 56/16.6
(58) Field of Search .................. 56/12.8, 13.3, 56/16.9, 202, 194, 203, 16.6, 199, 200, DIG. 8

(56) References Cited

U.S. PATENT DOCUMENTS

| | | |
|---|---|---|
| 3,863,428 A | 2/1975 | Baxter |
| 4,445,456 A | 5/1984 | Nelson |
| 4,635,047 A | 1/1987 | Fox et al. |
| 4,969,320 A * | 11/1990 | Langford ............ 141/95 |
| 5,189,870 A * | 3/1993 | Hohnl ............ 56/16.6 |
| 5,388,394 A | 2/1995 | Heismann |
| 5,425,223 A | 6/1995 | DeLaRonde |
| 5,605,033 A * | 2/1997 | Olmr ............ 56/10.2 R |
| 5,669,212 A * | 9/1997 | Bening et al. ............ 56/13.3 |
| 5,775,077 A * | 7/1998 | Olmr ............ 56/194 |
| 5,950,408 A * | 9/1999 | Schaedler ............ 56/10.2 R |
| 5,960,613 A * | 10/1999 | Mixon et al. ............ 56/10.2 R |
| 6,073,432 A * | 6/2000 | Schaedler ............ 56/199 |
| 6,089,006 A * | 7/2000 | Langford et al. ............ 56/13.3 |

FOREIGN PATENT DOCUMENTS

| DE | 91 11 827 U | 11/1991 |
|---|---|---|
| FR | 2658800 A1 | 8/1991 |
| FR | 2750005 A1 | 12/1997 |

* cited by examiner

Primary Examiner—Robert E. Pezzuto
Assistant Examiner—Árpád Fábián Kovács

(57) ABSTRACT

A material collecting fill indicator and pressure gauge is mounted on a conduit extending from a grass mower housing to a clipping container, with the conduit passing by an operator's seat on the mower. The fill indicator has a visible air pressure gauge to visibly show the operator the changes in the static air pressure within the conduit which reflected the degree to which the clipping container is filled.

5 Claims, 5 Drawing Sheets

APPARATUS AND METHOD FOR A MATERIAL COLLECTION FILL INDICATOR

BACKGROUND OF THE INVENTION

1) Field of the Invention

The present invention relates generally to a device for determining the degree to which a material collection system is full, and, more specifically, to a device for determining the degree to which a grass clipping container attached to a lawn mower is full.

2) Related Art

Indicators for determining grass flow collection for the most part provide an indicator mechanism for visually displaying the full condition of a lawn mower grass collection bag. These indicators, such as the type shown and described in U.S. Pat. No. 5,3888,394 inform the operator only when the bag is full. Because the indicators are inconsistent, the grass container can become overfilled and the system becomes plugged requiring the operator to disassemble the system and pull the packed and sometimes wet, sticky grass from the fill tube. This process is time consuming, cumbersome and frustrating for the operator. Other systems that measure air flow or use electric eyes or windows to determine fullness are likewise unreliable resulting in the same problems. Thus, there is a desire for a consistent indicator mechanism that provides gradual readings of the degree to which a container is full.

It is therefore an objective of the present invention to provide a device that consistently shows the degree to which a container is full.

It is another objective is to provide a device that allows an operator to observe a gradual increase in fullness of a container.

It is another objective is to provide a device that allows an operator sufficient time to stop mowing before the fill tube becomes plugged.

BRIEF SUMMARY OF THE INVENTION

A material collection fill indicator constructed in accordance with the teachings of the present invention is used with a tractor having a lower mower deck with a grass clipping outlet. An auxiliary blower is located adjacent the grass clipping outlet, with a closed housing extending thereover. A closed grass clipping container is on a rearward end of the tractor and an elongated conduit or fill tube extends upwardly and rearwardly from the closed housing to the top of the grass clipping container and extends laterally past an operator's seat. The material collection fill indicator includes a pressure gauge that is associated with the conduit and communicates with the interior of the conduit to measure the air pressure in the conduit. On the pressure gauge, in full view of the operator, is a visible indicia means to indicate levels of pressure sensed by the pressure gauge. The indicia means allows the operator to observe the increased level of air pressure in the conduit as the grass clipping container becomes increasingly full of clippings and determine the degree to which the grass clipping container is being filled.

DESCRIPTION OF THE PREFERRED EMBODIMENT

Figure 1:
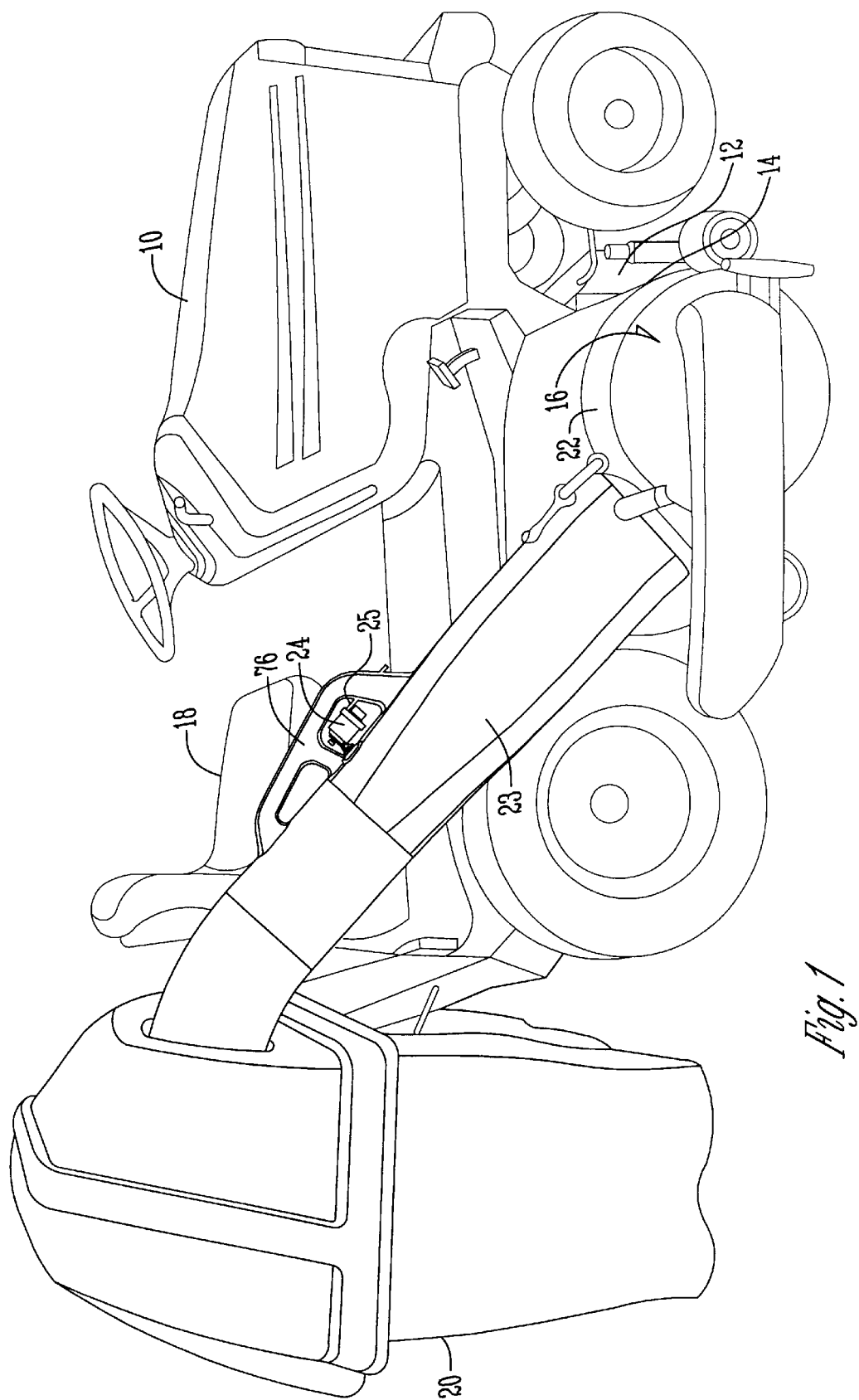
FIG. 1 is a side perspective view of the material collection fill indicator constructed in accordance with the invention attached to a lawn tractor.
Figure 2:
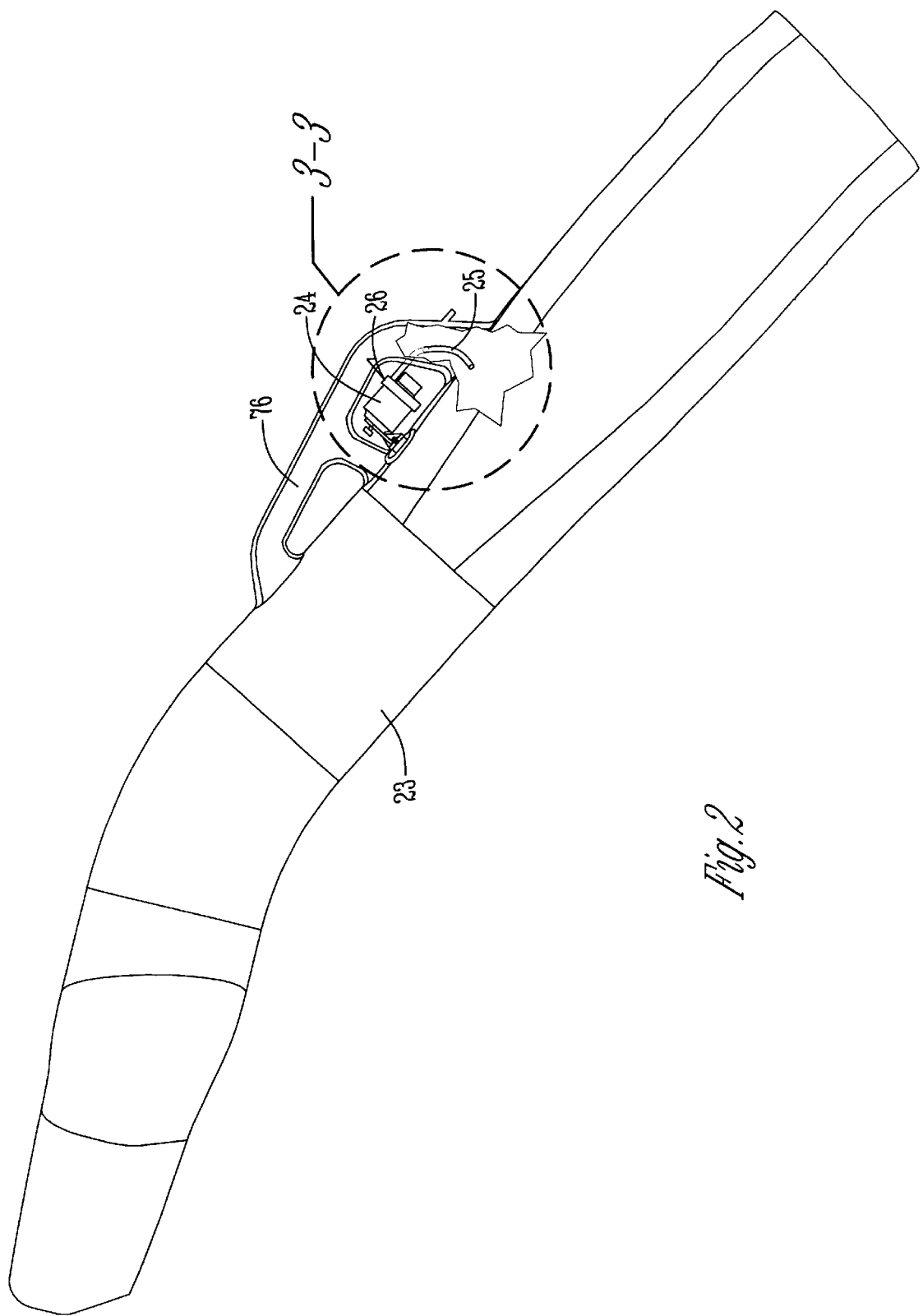
FIG. 2 is a side view of the fill indicator mounted on a grass clipping conduit.
Figure 3:
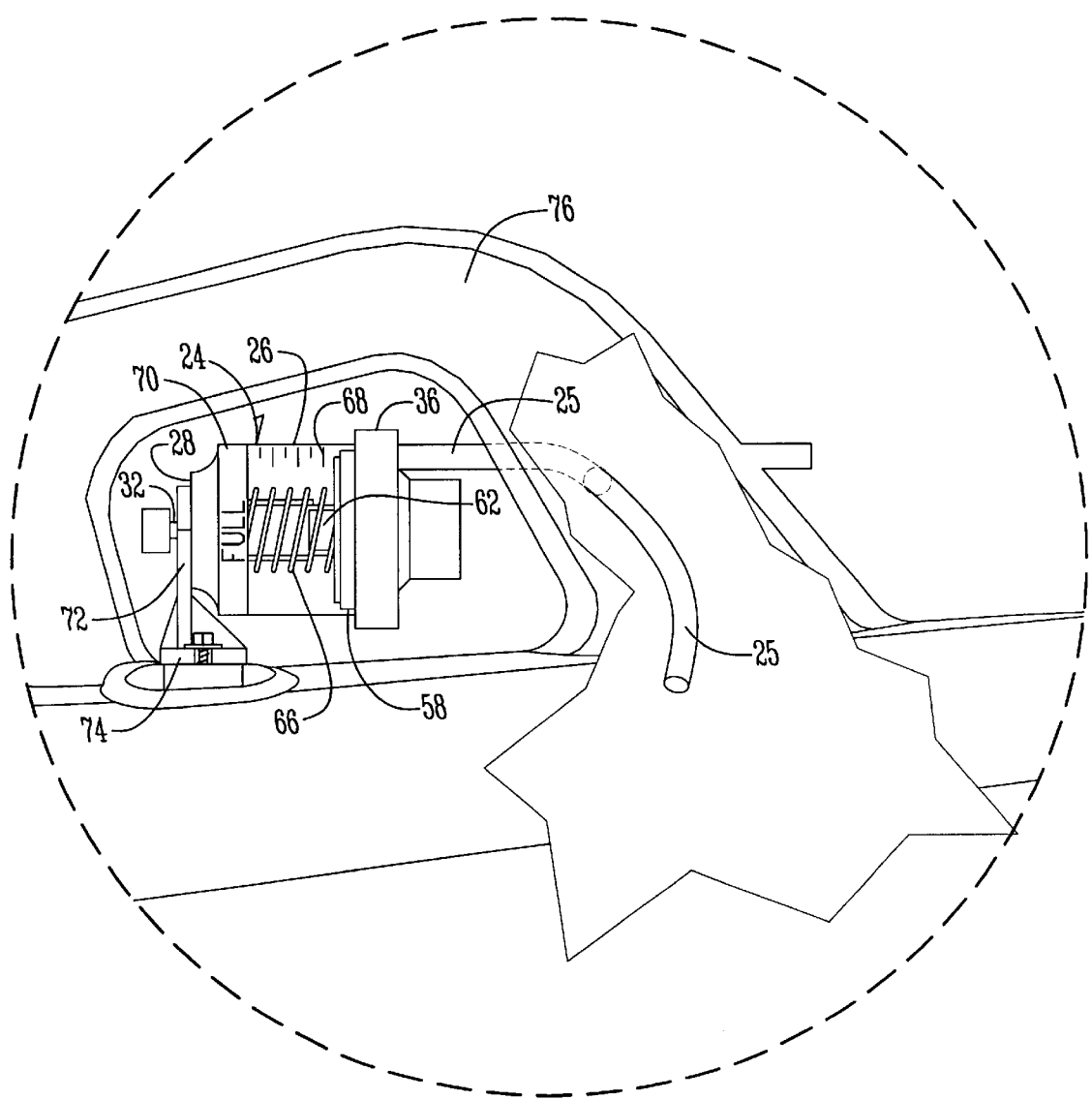
FIG. 3 is an enlarged side view of the fill indicator taken along line 3—3 of FIG. 2.

Referring to FIG. 1, a lawn tractor 10 has a lower mower deck enclosure 12 with a grass clipping outlet 14. Adjacent to the grass clipping outlet is an auxiliary blower 16 (although the blower is not required) and located toward the upper rearward end of the tractor 10 is an operator's seat 18. Mounted to the rearward end of the tractor 10 is a closed grass clipping container 20. Over the grass clipping outlet 14 and the blower 16 is a closed housing 22. Extending upwardly and rearwardly from the closed housing 22 to a top portion of the grass clipping container is an elongated conduit or fill tube 23 that extends laterally past the operator's seat 18.

Figure 4:
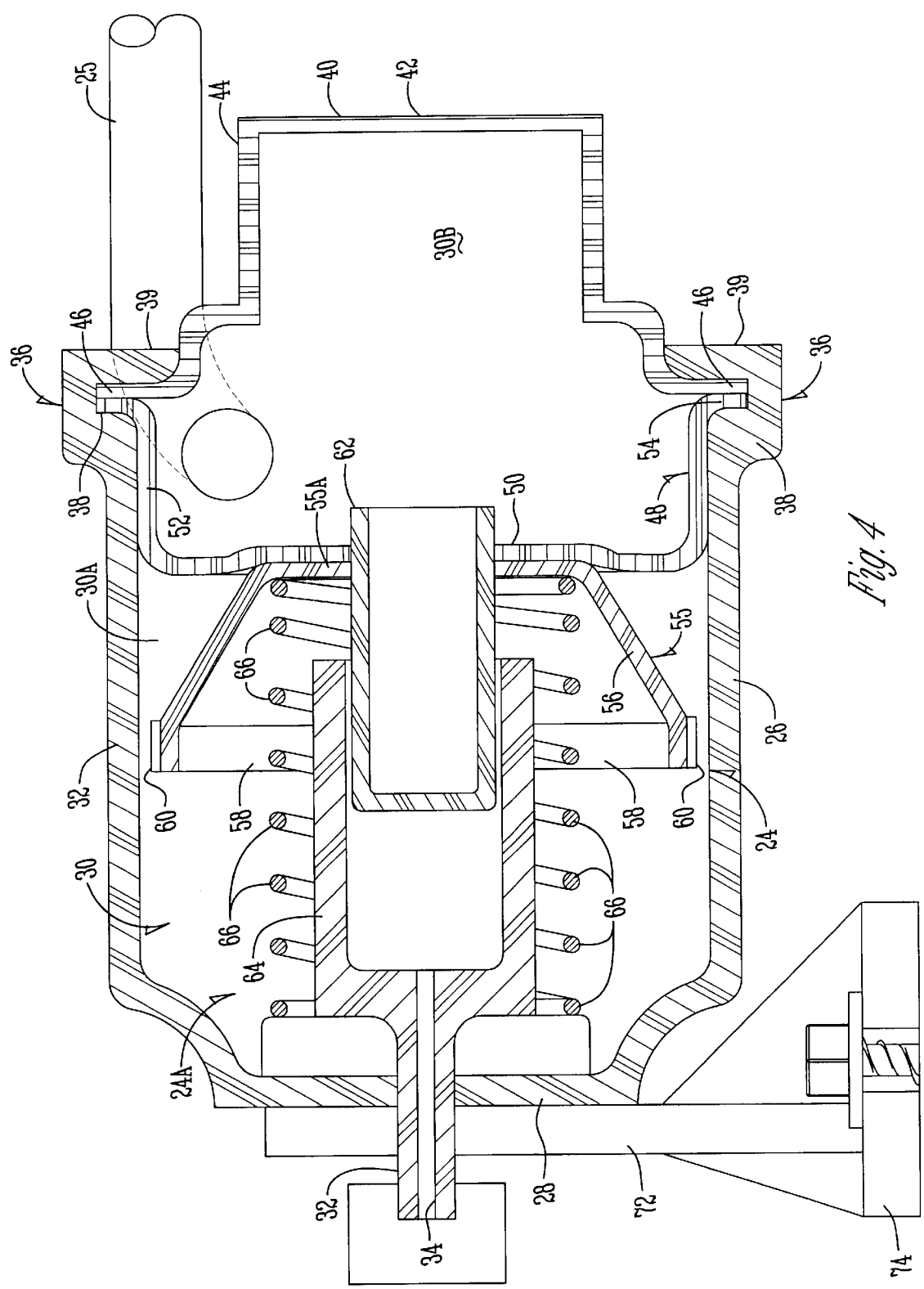
FIG. 4 is an enlarged scale side sectional view of the material collection fill indicator.

The fill indicator gauge 24A, as best shown in FIG. 4, includes a first housing 24. (FIG. 4). The gauge 24A is connected to the conduit 23 by an air line 25 that communicates with the interior of the conduit to measure the degree of static air pressure in the conduit. The gauge 24A is of a type generally shown in U.S. Pat. No. 4,445,456 herein incorporated by reference.

The fill indicator housing 24 is preferably formed of a suitable, substantially cylindrical transparent plastic material and consists of an annular side wall 26 and first end wall 28 defining an overall generally cylindrical chamber 30 within said housing. Extending centrally from the first end wall 28 is a neck portion 32 having a passage 34 therethrough that allows air to escape from the chamber through the passage 34.

An annular outward offset portion 36 is formed about the side wall 26 and an annular right angled shoulder 38 is shown formed at the inner side of the offset portion in underlying annular inwardly extending flange 39.

Forming and defining the second housing is a relatively short cylindrical cup shaped member 40 which may be a metal stamping or plastic molding and which has a lesser diameter than that of said first housing 24. The member 40 has an end or bottom wall 42 and an annular side wall 44. The member 40 also defines, along with the first housing 24, the overall chamber 30. The side wall 44 of member 40 terminates in a right angled flange 46 of a width to be set upon the annular flange 39.

An inverted or cup-shaped membrane or diaphragm 48 formed of pliable plastic having an end wall 50 and a side wall 52, is disposed within the first 24 and second 40 housings. A flange 54 on diaphragm 48 is disposed to overlie the flange 46 and to underlie shoulder 38. A suitable adhesive (not shown) may secure the flanges 46 and 54 between the shoulder 38 and the flange 39. The diaphragm 48 serves to divide the overall chamber 30 into two parts; a first chamber 30A adjacent to the end of the first housing 24, that is, adjacent to the end wall 28; and a second chamber 30B adjacent to the other end of the second housing, that is adjacent to the end wall 42 of member 40.

Seated upon and either adhesively or mechanically secured to the diaphragm 48 by a washer (not shown) is a upright tapered cup-shaped member 55 formed of rigid plastic. The member 55 has a bottom wall 55A overlying the bottom wall 50 of the diaphragm 48 and has an annular flared side wall 56 terminating in a vertical rim portion 58. A brightly colored ring 60 is on the rim portion 58 to form a readily visible indication within the housing 24 which by the longitudinal position of the gauge 24A indicates the amount of differential static air pressure in conduit 23 and hence the extent that container 20 is filled with clippings.

Extending from the center of membrane 48 towards end 28 is a post 62. Extending centrally from the end wall 28 is a transparent cylindrical guide sleeve 64 that receives the post 62 as the membrane 48 is pushed toward the end wail 28 by air pressure received through the air line 25. The sleeve 64 is of a length such that the post 62 will not be fully withdrawn from the sleeve 64 when the membrane is deflated.

Disposed within the chamber 30, and surrounding the sleeve 64, is a coil spring 66. The upper end of the spring 66 bears against the end wall 28 and the lower end is seated against the bottom wall 55A of member 55. The spring 66 resists the movement of the membrane 48 toward the upper end wall as air pressure from the air line 25 inflates the chamber portion 30B between the membrane 48 and the end wall 42. The force of the spring 66 also returns the membrane 48 to its deflated position when the grass clipping container 20 is empty and the air pressure in the conduit returns to normal.

Figure 5:
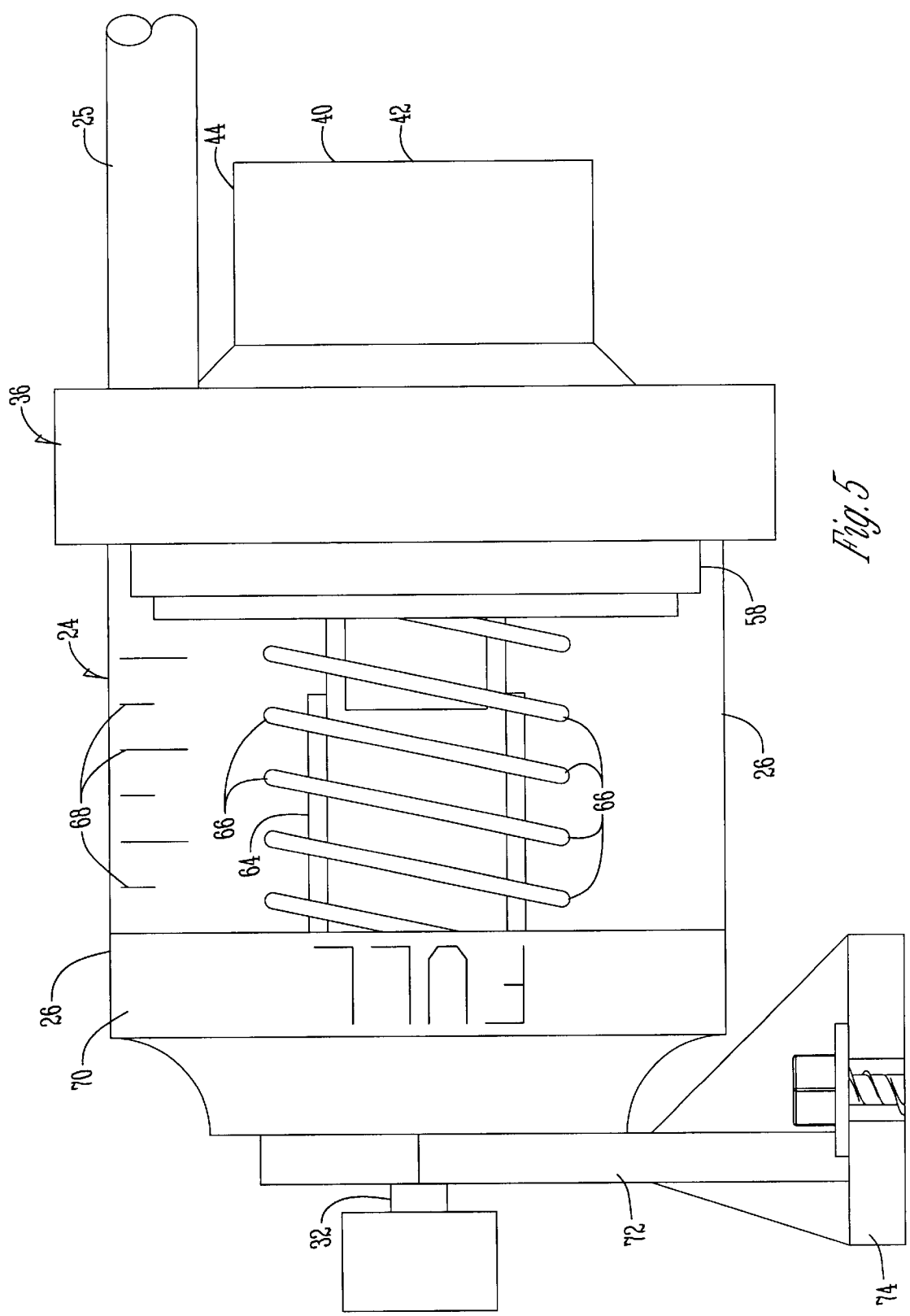
FIG. 5 is a side elevational view of the material collection fill indicator of FIG. 4.

Placed on the side wall 26 of the first housing 24 are spaced parallel lines 68 (FIG. 5) that indicate the degree to which the grass container 20 is full when the ring 60 is displaced to align with particular lines 68. The band 70 (FIG. 5) indicates that the grass container is full. The particular indicia lines 68 indicated are merely for illustration.

Connected to the neck 32 is a mounting plate 72 that extends perpendicular to the gauge 24A and has a base 74 for mounting the gauge 24 to the conduit 23. A guard rail 76 extends from the conduit over the housing 24 to protect the gauge 24A from being struck or dislodged.

By applying the pressure gauge 24A to the conduit 23, the gauge is used to measure the differential static pressure within the conduit 23 via air line 25 which connects conduit 23 to chamber 32B in housing 24. As the grass clipping container 20 becomes full, air pressure in the system increases and forces air through the air line 25 into the chamber 30B which gradually displaces the membrane 48 in a direction toward the end wall 28. As the membrane 48 moves, the post 62 rides within the guide sleeve 64 and pushes air out of chamber 30B through the passage 34.

By applying spaced indicia lines 68 (FIG. 5) to the side wall 26 of the gauge housing 24, an operator can view, from the operator's seat 18, the increased level of air pressure in the conduit 23 when the grass container 20 becomes increasingly full of grass clippings. As the ring 60 moves in conjunction with the displacement of the membrane or diaphragm 48, the ring 60 aligns with different indicia lines 68 to indicate a degree of fullness of container 20. From the information visually communicated from the indicia system an operator can determine the degree to which the container 20 is being filled and is made aware when to stop mowing and empty the container 20. Because the gauge 24 and ring 60 move slowly in relation to small pressure changes in the conduit 23, the operator has sufficient time to stop mowing before the container 20 is full and the conduit 23 is plugged. Once the container 20 is emptied the ring 60 is automatically reset because the air pressure in conduit 23 is returned to normal as the diaphragm 48 withdraws into chamber 30B by reason of the static air pressure in conduit 23 returning to normal.

From this description it can be seen that the fill indicator gauge 24A consistently shows the degree to which a container 20 is full allowing an operator to observe the gradual increase in fullness of the container, and provide the operator sufficient time to stop mowing before the system becomes plugged.

While a preferred embodiment of the invention has been shown and described, it is to be understood that the same is capable of modification without departure from the spirit and scope of the claims.

What is claimed is:

1. A combination of a tractor having a lower mower deck enclosure with a grass clipping outlet; an auxiliary blower located adjacent the outlet, an operator's seat, a closed grass clipping container mounted on the rearward end of the tractor, a closed housing over the grass clipping outlet and the blower, and an elongated conduit extending upwardly and rearwardly from the closed housing to a top portion of the grass clipping container and extending laterally past the operator's seat, the invention comprising:

a pressure gauge associated with the conduit and communicating with the interior of the conduit through an air inlet to measure the air pressure in the conduit; and a visible indicia means on the gauge in full view of a person sitting on the operator's seat to indicate progressive levels of pressure in the conduit as sensed by the pressure gauge, whereby the operator can observe an increased level of air pressure in the conduit when the grass clipping container becomes increasingly full of clippings to create back pressure within the conduit to thereby visually communicate to the operator the degree to which the grass clipping container is being filled with grass clippings.

2. The combination of claim 1 wherein the visible indicia means is a plurality of spaced parallel lines superimposed on a transparent body encompassing a movable air pressure sensitive plunger.

3. The combination of claim 1 further comprising a guard rail connected to the conduit and extending over the gauge.

4. A method of determining the degree to which a grass clipping container is filled with grass clippings in a tractor having a lower mower deck enclosure with a grass clipping outlet; an operator's seat, a closed grass clipping container mounted on the rearward end of the tractor, a closed housing over the grass clipping outlet, and an elongated conduit extending upwardly and rearwardly from the closed housing to a top portion of the grass clipping container and extending laterally past the operator's seat comprising the steps of:

placing a pressure gauge associated with the conduit and communicating with the interior of the conduit through an air inlet to measure the air pressure in the conduit; and placing a visible indicia means on the gauge in full view of a person sitting on the operator's seat to indicate progressive levels of pressure in the conduit as sensed by the pressure gauge, whereby the operator can observe an increased level of air pressure in the conduit when the grass clipping container becomes increasingly full of clippings to create back pressure within the conduit to thereby visually communicate to the operator the degree to which the grass clipping container is being filled with grass clippings.

5. A combination of a tractor having a lower mower deck enclosure with a grass clipping outlet; an operator's seat, a closed grass clipping container mounted on the rearward end of the tractor, a closed housing over the grass clipping outlet, and an elongated conduit extending upwardly and rearwardly from the closed housing to a top portion of the grass clipping container and extending laterally past the operator's seat, the invention comprising:

a pressure gauge associated with the conduit and communicating with the interior of the conduit through an air inlet to measure the air pressure in the conduit; and a visible indicia means on the gauge in full view of a person sitting on the operator's seat to indicate progressive levels of pressure in the conduit as sensed by the pressure gauge, whereby the operator can observe an increased level of air pressure in the conduit when the grass clipping container becomes increasingly full of clippings to create back pressure within the conduit to thereby visually communicate to the operator the degree to which the grass clipping container is being filled with grass clippings.

\* \* \* \* \*